April 29, 1941.  C. A. REIMSCHISSEL ET AL  2,239,736
CHASER AND CHASER HOLDER ASSEMBLY
Filed Jan. 4, 1939   3 Sheets-Sheet 1
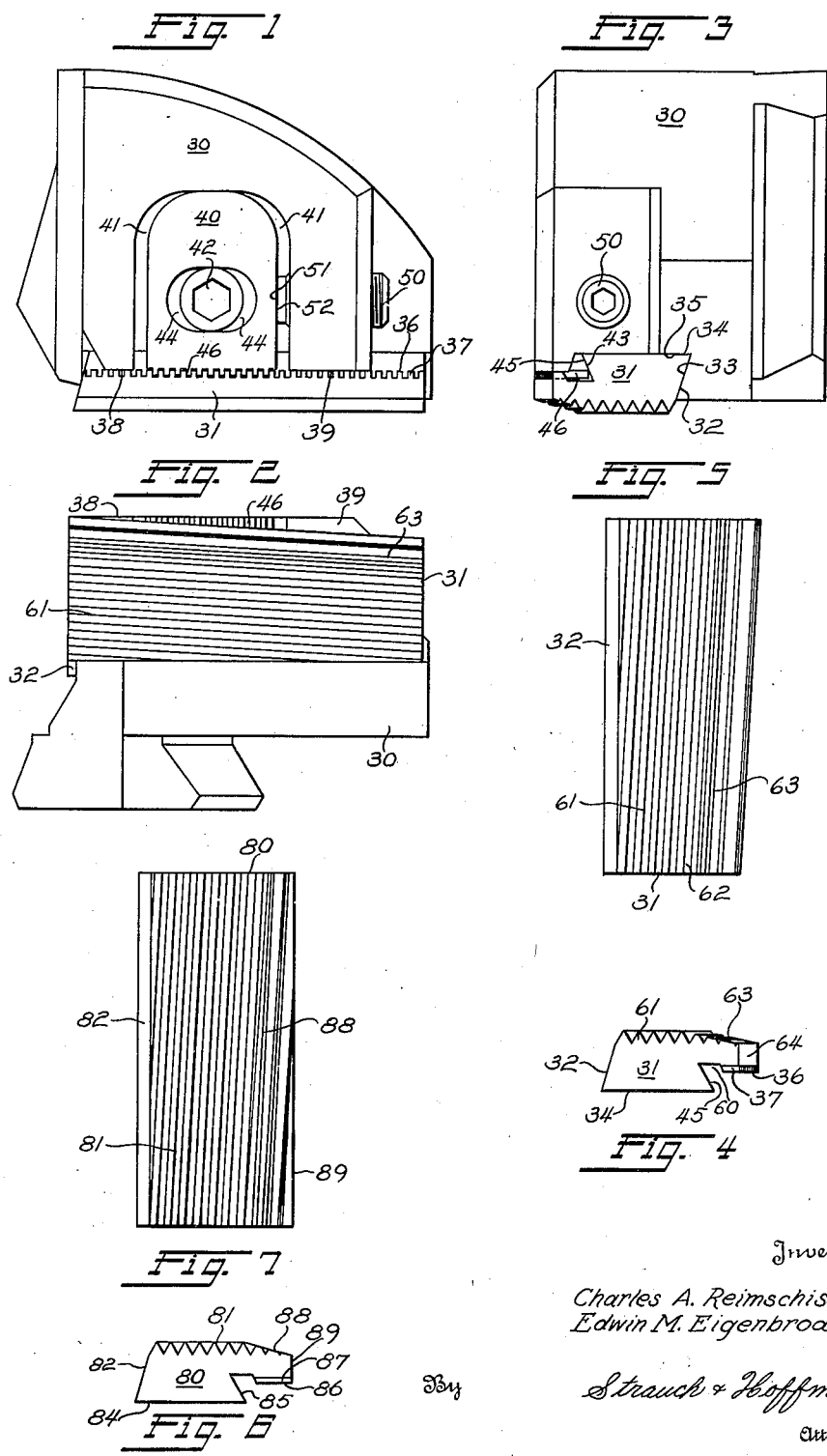
Inventor
Charles A. Reimschissel
Edwin M. Eigenbrode
By Strauch & Hoffman
Attorneys April 29, 1941.  C. A. REIMSCHISSEL ET AL  2,239,736
CHASER AND CHASER HOLDER ASSEMBLY
Filed Jan. 4, 1939  3 Sheets-Sheet 2
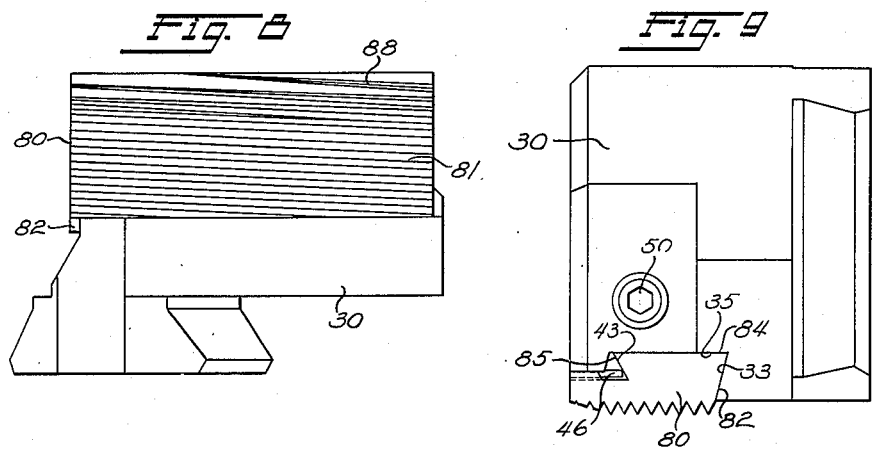
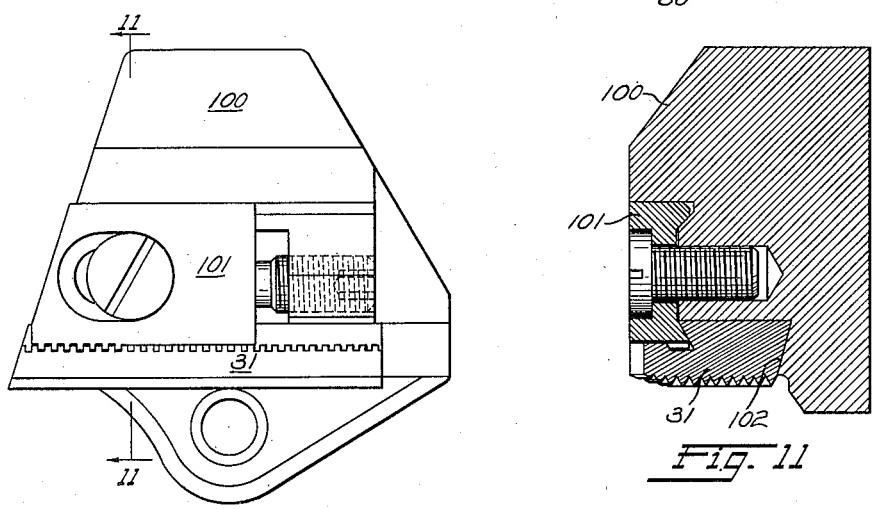
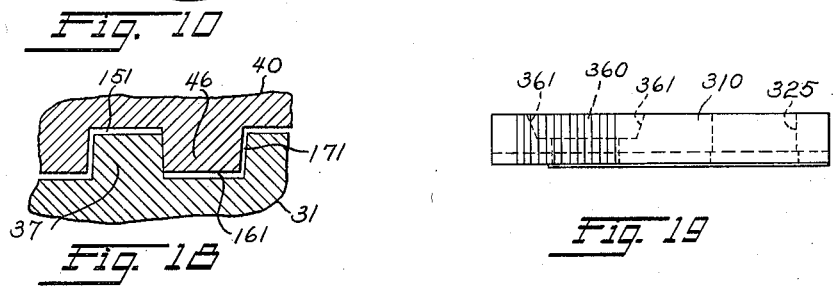
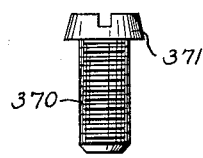
Inventor
Charles A. Reimschissel
Edwin M. Eigenbrode
By Strauch & Hoffman
Attorneys

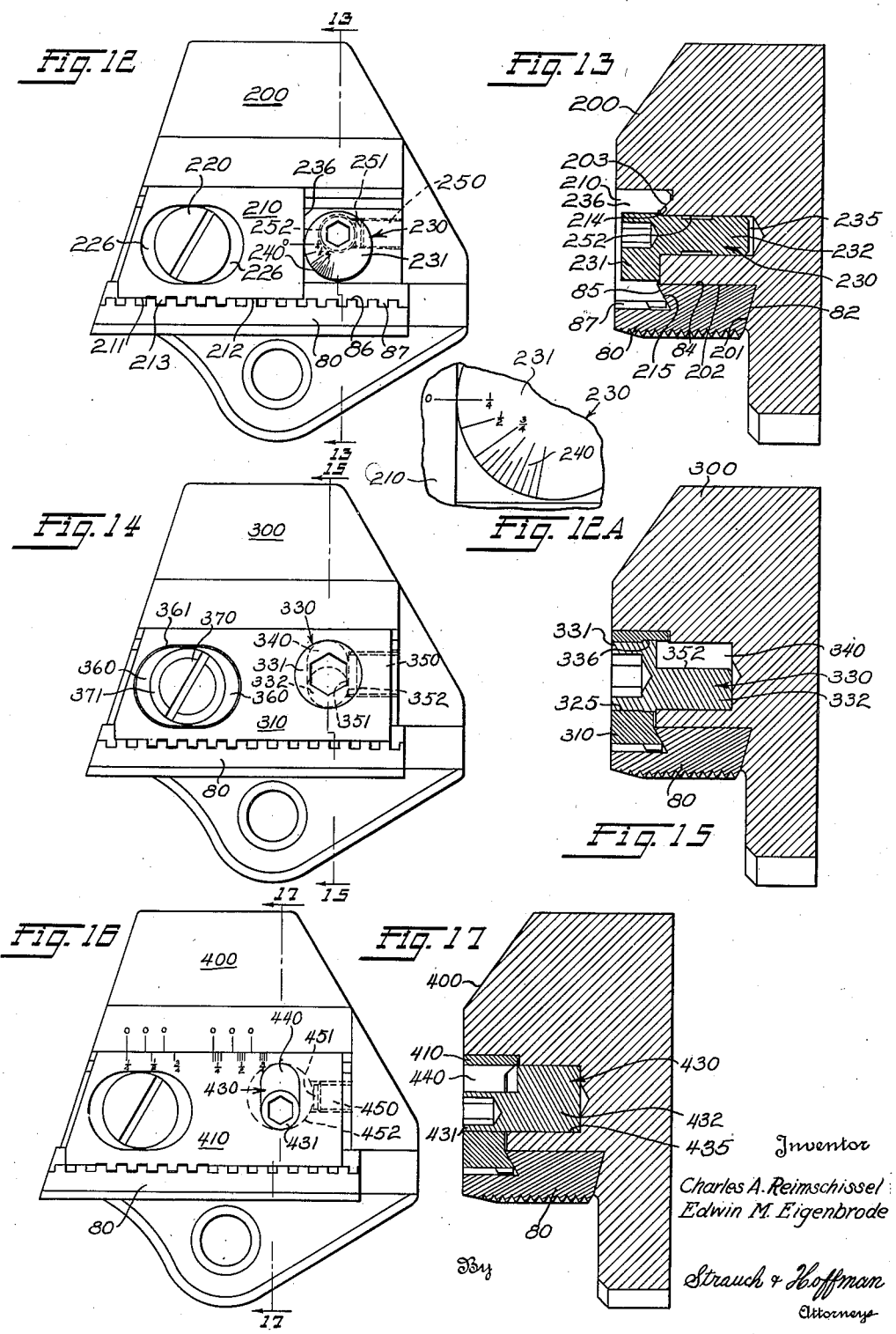

Patented Apr. 29, 1941

2,239,736

UNITED STATES PATENT OFFICE 2,239,736

CHASER AND CHASER HOLDER ASSEMBLY

Charles A. Reimschissel and Edwin M. Eigenbrode, Waynesboro, Pa., assignors to Landis Machine Company, Waynesboro, Pa., a corporation of Pennsylvania Application January 4, 1939, Serial No. 249,324

18 Claims. (Cl. 10—104)

This invention relates to thread cutting devices and more particularly to improvements in means for mounting and adjusting thread cutting tools, or chasers, used in certain types of die-heads as well as to improvements in the chasers themselves.

As is well known to those skilled in the art, die-heads of the kind herein considered are provided with a plurality of cutter elements arranged to be held in operative cutting position during thread cutting and to be moved away from the workpiece at the end of the thread. These cutter elements comprise a holder for receiving the tool or chaser, a clamp for clamping it in place, and, commonly, an adjusting screw abutting one end of the chaser directly for moving it longitudinally in the holder. The holder may be pivoted to, or slidably mounted for radial movement on, the head body which encloses suitable operating mechanisms, generally controlled by the cutter elements, for retracting the chaser from the work at the end of thread cutting.

Typical examples of die-heads of this type are disclosed in the United States Patents to Newman, No. 1,692,514 and Reimschissel, No. 2,082,757, the former showing a pivotal holder mounting while in the latter the holders are radially slidable. As will be observed, in devices of this type the cutting tool or chaser, as it is commonly called, consists of a generally rectangular piece of metal, bevelled at one end to form a cutting edge, and grooved along one face to provide thread cutting and control serrations.

Due to the helical nature of the threads to be cut, and to avoid interference between the chaser threading and control serrations and the finished thread, these serrations must be inclined to the longitudinal axis of the work at an angle equal to the lead or helix angle of the thread being formed. Accordingly, with the type of chaser disclosed in these patents and having its threading serrations arranged parallel to its longitudinal axis, the holder surface which supports the chaser is appropriately inclined, as is apparent, for example, in Figure 2 of Patent No. 1,692,514. The same result may also be obtained by forming the thread cutting serrations at an angle to the longitudinal axis of the chaser, and chasers of both types are in use today.

Thus, chaser holder assemblies or cutter control elements employing longitudinal tangential type chasers may roughly be divided into two general classifications: first, those incorporating chasers having their thread-cutting serrations parallel to the longitudinal axis of the chaser, the helical relationship of the serrations and work being established by the inclination of that axis with respect to the base of the holder; and, second, those incorporating chasers having their thread-cutting serrations inclined to the longitudinal axis of the chaser by the amount of the desired helix angle, the longitudinal axis of the chaser being parallel to the base of the holder, and the base, or back, of the holder in each case being normal to the axis of the work.

In use, these chasers are arranged tangent to the cylindrical surface of the work being threaded and with their cutting edges positioned at said points of tangency. This gives rise not only to the term "tangential chaser," by which these cutting elements are known throughout the trade, but also to the necessity of providing means for adjusting the chasers so that their cutting edges assume this position, both upon initial installation as well as subsequent to sharpening. In other words, regardless of which class of chaser holder assembly is employed, some means must be provided to effect a primarily longitudinal displacement of the chaser with respect to the holder, for the thread-cutting operation gradually dulls the cutting edge of the chaser, and a new cutting edge must be presented to the work. Also, a similar adjustment must be made when a change in thread size is effected.

Consequently, numerous devices for longitudinally adjusting tangential chasers have been devised and are presently in use; perhaps the most common of these being the adjustment screws mentioned above and disclosed in the two patents to which reference has already been made. It has also been proposed, as in the patent to Reimschissel, Reissue No. 20,930, to interlock the chaser with its clamp and to effect chaser adjustment by movement of the clamp and chaser, as a unit; the several advantages of this arrangement being fully set forth in said patent. In our copending application, Serial No. 249,325 filed on even date herewith, there are disclosed several improved forms of chaser-holder assemblies involving the unitary chaser-clamp adjustment feature of said last named patent, but in which the adjustment serrations, utilized for interlocking the chaser to its adjustable clamp, are arranged on offset chaser seating surfaces.

The present invention is primarily concerned with chaser-holder assemblies of the last mentioned type and particularly with novel and improved adjustment means and chasers therefor. Although our chaser-holder assemblies herein described are well adapted for use with each of the two classes of chasers mentioned above, they are primarily intended to be used in connection with chasers having the helix angle incorporated in the thread cutting serrations thereof and of the improved types herein disclosed. Likewise our several improved adjustment means embody novel features which peculiarly adapt them for adjusting chasers having the helix angle incorporated therein, the adjustment of which presents unusual problems as will be now explained.

The use of tangential chasers incorporating the helix angle in their thread-cutting serrations introduces certain inherent adjustment difficulties which are not associated with tangential chasers whose helical relationship is established by the inclination of the chaser with respect to the base of the chaser holder. As the latter type of chaser is longitudinally advanced in its holder, to bring the cutting edge into proper position, the thread-cutting serrations always maintain the same relative axial relationship, with respect to the base of the holder, at the tangent to the work. Thus, these chasers need not be reground any exact amount, nor do they have to be ground in relation to each other. However, this is not true of chasers of the former type whose helical relationship is established by inclination of the threading serrations for any longitudinal displacement of these chasers, for cutting edge adjustment, results in an axial displacement, with respect to the base of the holder, of the thread-cutting serrations at the cutting edge. This is due to the fact that the chaser does not move parallel to the threading serrations but parallel to the base of the holder and at an angle to said serrations.

Chasers of both types are, of course, used in sets of four, six, eight, etc., and accordingly when arranged in a die head must have their threading serrations, at the cutting edge, progressively and axially offset by an amount equal to one-quarter, one-sixth, or one-eighth of a thread pitch. This offset is generally taken care of in the chasers themselves and therefore the chasers must be made in sets and consecutively numbered, to insure their proper assembly in the holders. Furthermore, the offset chaser serration relationship, thus established, must not be disturbed by subsequent chaser adjustments as would be done if chasers having their thread serrations obliquely inclined with respect to the line of chaser adjustment are moved unequal amounts. As will be apparent from what has already been said this last condition is not met with in the case of chasers having their serrations running parallel to the line of adjustment.

Accordingly, chasers of the type wherein the helix angle is in the thread serrations must be ground in definite relationship with respect to each other so that, when placed in their holders, and adjusted to proper cutting position, the previously established offset relationship will be maintained. In the present application we disclose novel chasers of this type having adjustment serrations, located on offset chaser seating surfaces so arranged with respect to the inclined thread serrations, as to insure proper initial chaser location, to provide natural and convenient data or reference lines for matched chaser grinding and also to serve to lock the chaser to its clamp for unitary adjustment therewith. This application also discloses several improved types of adjustment means especially adapted for use with such novel chasers.

Therefore, a primary object of our invention is to provide improved chaser-holder assemblies of the type wherein the chaser and holder are adjusted as a unit, which embody novel means for adjusting the chasers.

A further object of our invention is to provide improved chaser-holder assemblies, of the type just mentioned, wherein the novel adjustment means is peculiarly adapted for use in connection with chasers having inclined thread cutting serrations.

A still further object of our invention is to provide improved chaser holder assemblies having novel adjustment features embodying rotatable eccentric devices.

A still further object of our invention is to provide improved chaser-holder assemblies having adjustment elements provided with novel indicia means for facilitating chaser adjustment for various thread sizes and also after selective, and matched chaser, regrinding.

It is also an object of our invention to provide novel types of chasers having thread-cutting serrations inclined thereon and embodying locating and adjustment serrations on offset seating surfaces thereof.

Another object of our invention is to provide novel chaser clamp and clamp screw construction which obviates the collection of dirt or chips adjacent working surfaces thereof and is self-cleaning.

The foregoing and other ancillary objects will become apparent from a study of the following detailed description of preferred embodiments of our invention when considered with the appended claims and accompanying drawings, wherein:

Figure 1 is a top view of one of our improved chaser holder assemblies;

Figure 2 is the face view of the chaser holder assembly of Figure 1;

Figure 3 is an end view of the chaser holder assembly of Figures 1 and 2;

Figure 4 is an end view of the novel chaser used in the chaser holder assembly illustrated in Figures 1, 2 and 3;

Figure 5 is the face view of the chaser illustrated in Figure 4;

Figure 6 is an end view of a modified form of chaser similar to that disclosed in Figures 4 and 5;

Figure 7 is the face view of the chaser illustrated in Figure 6;

Figure 8 is the face view of a chaser holder assembly incorporating the chaser illustrated in Figures 6 and 7;

Figure 9 is an end view of the chaser holder assembly illustrated in Figure 8;

Figure 10 is the top view of a modified type of chaser holder assembly;

Figure 11 is a sectional view of this last mentioned type of chaser holder assembly taken on the line 11—11 of Figure 10;

Figure 12 is the top view of a chaser holder assembly incorporating a novel type of adjustment mechanism;

Figure 12A is an enlarged view of a part of the assembly shown in Figure 12;

Figure 13 is a sectional view of the chaser holder assembly of Figure 12 taken along line 13—13 of that figure;

Figure 14 is the top view of a further modified type of chaser holder assembly somewhat similar to that illustrated in Figure 12, but having a different adjustment mechanism;

Figure 15 is a sectional view of the above mentioned chaser holder assembly taken along line 15—15 of Figure 14;

Figure 16 is the top view of a still further modified type of chaser holder assembly also somewhat similar to that illustrated in Figure 12, and showing a still different type of adjustment mechanism.

Figure 17 is a sectional view taken along line 17—17 of Figure 16;

Figure 18 is a partial sectional view showing the outline of the adjustment serrations employed by the various illustrated chaser clamps and chasers;

Figure 19 is a front view of the chaser clamp used in the chaser holder assembly illustrated in Figures 14 and 15;

Figure 20 is a view of the clamping screw used in conjunction with the clamp illustrated in Figures 14, 15 and 19.

Referring now to the drawings and particularly to Figures 1 through 5 thereof, chaser holder 30, which is of the radially slidable type, has mounted thereon a tangential chaser 31, base seating surface 32 of chaser 31 being in intimate contact with a coacting surface 33 of holder 30, while a chaser back seating surface 34 likewise contacts a coacting holder surface 35. Chaser 31 has an offset seating surface 36 which is grooved with a plurality of adjustment serrations 37. The crests of these adjustment serrations form the offset seating surface 36 which contacts holder surfaces 38 and 39 thereby providing additional bearing surfaces for the chaser back of its cutting face, when assembled in its holder.

Coacting with chaser 31 and holder 30 is a chaser clamp 40 which rests in a recess 41 of the holder 30. Clamp 40 is normally free to move a limited longitudinal distance within the holder recess 41; however, clamping screw 42, whose head rests in a suitable recess 44 of clamp 40 and whose shank is threaded into holder 30 fastens clamp 40 to holder 30 in any desired position, within the range of longitudinal movement of the clamp. Clamp 40 also has a clamping surface 43 which coacts with a chaser clamping surface 45, and adjustment serrations 46 on clamp 40 intermesh with the mating serrations 37 on the chaser 31. Thus, when these coacting adjustment serrations are interlocked, with screw 42 loosened, the clamp and the chaser may be adjusted, as a unit, with respect to the holder. After the said adjustment is effected, clamping screw 42 is tightened to fasten the clamp and the chaser in adjusted position.

The adjustment serrations 37 of chaser 31 and the coacting adjustment serrations 46 of clamp 40 are more clearly disclosed in Figure 18. From this figure, it can be seen that the sides of the serrations are slightly inclined, or slanted, in order to facilitate the machining of these parts. However, if it be so desired, these teeth or serrations may have perpendicular sides. Clearances 151 and 161, between adjacent crests and bottoms of the serrations 37 and 46, are provided; and, also, a slight clearance 171, between adjacent coacting teeth or serrations, is provided. These clearances insure that the serrations will not interfere with the seating action of holder surfaces 38 and 39. In the other views, due to the smallness of scale and to facilitate execution of the drawings, the serrations have been shown with perpendicular sides. Thus, these serrations have the same general form or outline as do the ones disclosed in our aforementioned copending application.

The means for effecting the above mentioned adjustment of the chaser comprises an adjusting screw 50, threaded into the holder 30 and having a blunt end 51 that contacts side 52 of clamp 40. Chaser 31 may be initially positioned, with respect to the holder 30, by suitably intermeshing its adjustment serrations with those of the clamp 40; and its final positioning is effected by adjusting the clamp and chaser unit by means of the adjusting screw 50. It should be noted that clamping screw 42 does not interfere with the longitudinal motion of the clamp, for its head is normally free to slide in clamp recess 44, while the shank of the screw passes through an elongated clearance hole (not shown) in the clamp.

Referring now to Figures 4 and 5, chaser 31 has a base seating surface 32, a back seating surface 34, an offset seating surface 36 which is substantially parallel to the back seating surface 34 and which is grooved to form adjustment serrations 37, and a clamping surface 45. It should be noted that the base seating surface 32 and the clamping surface 45 are oppositely bevelled with respect to the back seating surface 34 and that a recess 60 is located between the said clamping surface 45 and the offset seating surface 36. All of this is also true of the chaser disclosed in the said copending application; however, the present chaser has the thread-cutting serrations 61 of the cutting face 62 inclined, with respect to the base seating surface 32 or with respect to the longitudinal axis of the chaser, at the helix angle of the thread to be cut. Thus, the helical relationship of the thread-cutting serrations 61 is established by their inclination on the cutting face 62 and not by inclining holder surface 33, as has formerly been done.

The prior art discloses chasers having their thread-cutting serrations parallel to the chaser axis, and such chasers must be used in holders having an inclined seating surface which coacts with the chaser base seating surface to have the thread-cutting serrations approach the work at the proper helix angle as, for example, is shown in the aforementioned patents to Newman, No. 1,692,514 and Reimschissel, No. 2,082,757. On the other hand, chasers such as chaser 31 incorporate the helix angle in the inclination of their thread-cutting serrations; therefore, holder surface 33 is made to be parallel to the base of the holder.

With continued reference to Figures 4 and 5 and also to Figures 6 and 7, the chaser shown in the first two mentioned figures is very similar to that disclosed in the last two mentioned ones. Chaser 80 has a base seating surface 82 which is similar to the base seating surface 32 of chaser 31; its back seating surface 84 is similar to the corresponding back seating surface 34; its clamping surface 85 is similar to the clamping surface 45; its offset surface 86 is similar to offset surface 36; its adjustment serrations 87 are similar to adjustment serrations 37, and its thread cutting serrations 81 are inclined like thread-cutting serrations 61. The main difference between the two chasers lies in the fact that chaser 31 has its thread-cutting throat surface 63 formed as a plane extending in a direction parallel to the thread-cutting serrations 61 while chaser 80 has its thread-cutting throat surface 88 formed as a plane extending in a direction parallel to its base surface 82 and at an angle to the serrations. Also, it should be noted that the top surface 89 of chaser 80 is likewise parallel to the base surface 82; therefore, in face view (see Figure 7) this chaser is rectangular in outline; whereas, the top surface 64 of the chaser 31 is helically inclined with respect to the base surface 32, thus making the face view (see Figure 5) of the chaser 31 trapezoidal in outline. Chasers formed in the manner of chaser 31 have the important advantage of providing a throat which is equally effective after each regrinding of the chaser. Those formed in the manner of chaser 80 are more readily machined than the other type.

Figures 8 and 9 show the chaser 80 being used with the holder 30 which was illustrated in Figures 1, 2 and 3 and which was described during the discussion on these last mentioned figures. It can thus be seen that either chaser 31 or chaser 80 can be used with holder 30 and this is also true of the several other types of holders about to be described. Figure 8 corresponds to Figure 2 while Figure 9 corresponds to Figure 3. It is felt unnecessary to draw a figure corresponding to Figure 1, for the top view of the chaser holder assembly is not altered if chaser 80 is substituted for chaser 31, or to describe the elements of this holder assembly again.

With reference to Figures 10 and 11, chaser 31 is now shown in a chaser holder assembly comprising a substantial holder 100 of the pivotal type, and a U-shaped clamp 101, adapted to coact with the holder and to lock the chaser in its adjusted position and to permit longitudinal adjustment of the clamp and chaser unit. This type of chaser holder assembly will not be further discussed, for with the exception of the fact that the holder is of the pivotal type, and a U-shaped clamp used, the assembly is similar to those illustrated in Figures 1, 2 and 3 and described above.

The chaser holder assemblies just described are also similar to those disclosed in our co-pending application with a significant distinction; namely, that the chaser of said assemblies is novel and different having its thread-cutting serrations inclined, and also is mounted in the holder with its longitudinal axis parallel to its line of adjustment. As has been previously explained, the inclination of the chaser threading serrations with respect to the line of chaser movement introduces certain difficulties of adjustment, due to the resulting axial displacement of the thread serrations at the cutting edge of the chaser.

However, in our novel chasers the adjustment serrations, being fixed with respect to the inclined thread serrations, may be used in grinding as reference points. As will be observed, these adjustment serrations extend throughout the whole length of the chaser, thus, in grinding, these adjustment serrations are also ground away and the amount removed, be it a whole serration or only a fractional part thereof, may be readily observed and is a direct measure of the axial thread serration displacement which will result when the chaser is adjusted to cutting position, after grinding. Accordingly, by reference to these adjustment serrations, an equal amount can be removed from all the chasers of a set, so that when returned to the holder, and readjusted to cutting position, the chasers will all have been subjected to equal longitudinal movement and hence the several thread-cutting serrations will occupy the same relative axial positions as before grinding.

Utilizing these novel types of chasers, it is also possible to provide our chaser-holder assemblies with improved adjustment devices, now to be described, which are capable of great flexibility of adjustment and permit ready and accurate chaser resetting, after grinding, regardless of the amount of metal removed from the chasers.

Referring now to Figures 12 and 13, chaser holder 200 has mounted thereon chaser 80, base seating surface 82 of chaser 80 being in intimate contact with a coacting surface 201 of holder 200 while chaser back seating surface 84 contacts a coacting holder surface 202. Chaser 80 has its offset seating surface 86 in intimate contact with clamp surfaces 211 and 212 of a clamp 210, and adjustment serrations 87 of chaser 80 are intermeshed with matching adjustment serrations 213 on clamp 210. Thus, these two members are interlocked for unitary adjustment by the intermeshing of their respective adjustment serrations.

Chaser clamp 210 has a clamping surface 215 which coacts with inclined chaser clamping surface 85 to clamp the chaser 80 to the holder 200. The clamping force is provided by clamping screw 220 whose head rests in a recess 226 of clamp 210 and whose shank passes through an elongated hole in the clamp 210 (hole not shown) and is threaded into the holder 200. Thus, the clamp and the chaser may be moved, longitudinally, as a single unit, the surfaces 201 and 203 of the holder acting as guideways for the chaser surface 82 and the clamp surface 214, respectively.

The novel adjustment mechanism which is disclosed in these two figures comprises a cylindrical member 230 having a cylindrical head 231 which is eccentric to the stem 232 thereof. Stem 232 fits snugly within a bore 235 of the holder 200 while head 231 of member 230 abuts end 236 of clamp 210. Head 231 of member 230 is provided with a socket type opening for the reception of a suitable adjusting wrench. This opening is concentric with the axis of the stem 232. Therefore, rotation of the member 230 clockwise will result in a displacement of the clamp 210 to the left, due to the eccentric throw of head 231 of member 230. This eccentric throw is preferably greater than the pitch of the adjustment serrations 87 so that the chaser may be infinitely adjustable with respect to the holder.

Head 231 of member 230 is also provided with a series of graduations 240 located on the top thereof, shown at enlarged scale in Figure 12A. These graduations occupy a segment of cylindrical head 231 which is somewhat less than a quarter part thereof and comprise three sets of four equal length lines. The first line of each set is marked to correspond to a certain thread size in the order of increasing thread diameters, e. g., ¼ inch, ½ inch or ¾ inch. The latter condition is required since in opening the head, to accommodate larger diameter work, holder 200 will be pivoted in a clockwise direction thus withdrawing the chaser cutting edge tangentially away from the center of the work, as well as radially therefrom. Accordingly, the angular spacing of the marked index lines is such as to compensate for the aforementioned tangential movement. The other lines of each set, which, as has been explained, are of equal length, are angularly spaced from the marked line and each other an amount sufficient to cause longitudinal movement of the chaser by a quarter of the pitch of adjustment serrations 87 when the head 231 is rotated through an angle equal to said spacing.

Thus, if the chaser holder assembly, shown in Figures 12 and 12A set to cut a ¼ inch thread, is to be used to cut a ½ inch bolt, the adjustment member 230 is rotated until the ½" index line matches the "0" mark on the top surface of the clamp 210. This assures that the chaser has its cutting edge along a tangent to the work which is to be threaded; it being understood that the chaser, initially ground so as to assure this relationship, is suitably interlocked with clamp 210, which, due to the coarseness of the pitch of adjustment serrations 37, can be readily done by eye. One such index line is provided for each different diameter of work that can be threaded by the particular chaser holder assembly in the example shown, ¼ inch, ½ inch and ¾ inch.

When the chaser is removed and reground only a fraction of an adjustment serration pitch instead of an entire one, the member 230 is rotated until the proper index line for that particular diameter compensates for the amount of metal removed from the chaser and again establishes the correct tangential position. Thus, if one-quarter of an adjustment serration were ground away and the work were ½ inch stock, the adjustment member would be rotated until the next line, equal in length to the ½ inch index line, would match the "0" mark on the clamp. If one-half of an adjustment serration pitch were ground away, it would be necessary to rotate the adjustment member 230 to the second line whose length was the same as that of the ½ inch index line, and if three-quarters had been ground away the third or last line is used. When a whole serration pitch is removed the chaser is moved with respect to the holder, a distance equal to one pitch, and the setting is again on the marked line. An index line of a different length is provided for each diameter to be cut, and the other equal length lines are provided to show the rotation necessary to re-establish the tangential relationship of the chaser after grinding.

This arrangement makes it possible to use chasers of this type (having helically inclined thread-cutting serrations) more economically than is possible with any other type of adjustment means, since equal amounts, i. e., ¼, ½ or ¾ of an adjustment serration pitch can be ground off of all of a set and each readily adjusted to proper position in accordance with the amount removed.

Finally, a locking screw 250 is threaded into the holder 200 and has its blunt end 251 abutting a grooved portion 252 of stem 232 of adjustment member 230. This locking screw prevents adjustment member 230 from falling out of holder 200 and may be used to lock adjustment member 230 in adjusted position, whereby it is capable of counteracting some of the cutting thrust against the chaser and the clamp unit.

The disclosures illustrated in Figures 14 and 15 and in Figures 16 and 17 are rather similar to that which has just been discussed. Since these disclosures differ primarily in the structure of the adjustment mechanism, the discussion will be confined to that subject.

Figures 14 and 15 show a holder 300 utilizing chaser 80 and a chaser clamp 310. The adjustment mechanism herein employed comprises an adjustment member 330 which has a cylindrical head 331 located within a shouldered bore 325 of the clamp 310. The head 331 of adjustment member 330 is provided with a socket-type opening which is concentric with the axis of the head and which is adapted to receive an adjusting wrench. Adjustment member 330 also has a stem 332 which is eccentrically displaced from the axis of the head 331. This stem coacts with slot 340 in the holder 300 to effect the motion of the clamp 310 as the head 331 is turned.

The flange portion 336 of head 331 prevents the adjustment member from dropping out from the holder; and a locking screw 350 is threaded into the holder so that its point 351 may bear against the periphery 352 of the stem 332 of adjustment member 330. Thus, this disclosure is very similar to the one which has just been discussed; and since the two types of adjustment mechanisms function in the same manner, the discussion on the adjustment of the chaser previously given also holds for this type of chaser holder assembly, also head 331, and clamp 310 will be provided with index markings similar to those just described in connection therewith.

Occasionally, it is rather difficult to adjust the clamp and chaser unit if metal cuttings or grit have been permitted to pack between the head of the clamping screw and the side wall of the coacting recess in the clamp. To minimize the possibility of such packing, the head of the clamping screw should be bevelled and the same procedure should be followed with the side wall of the coacting clamp recess. This construction is shown in the above discussed assembly and is shown, in detail, in Figures 19 and 20. From these latter two figures, it can be seen that clamp 310 has the side wall 361 of recess 360 appreciably inclined. Also, head 371 of clamping screw 370 is oppositely bevelled. When the clamp and chaser are adjusted in the holder, the opposite bevels 371 of screw 370 and 361 of clamp recess 360 tend to force the dirt out from recess 360. Thus, this arrangement, which may be used on other chaser assemblies, overcomes chip packing difficulties which might otherwise occur were the side walls of the recess and periphery of the head of the clamping screw parallel to each other.

Figures 16 and 17 show a further type of adjustment mechanism with which this invention is concerned. Here, holder 400, chaser 80, and chaser clamp 410 are utilized in the same manner as before. The adjustment mechanism herein employed utilizes adjustment member 430 which has a head 431 working with an elongated slot 440 in the clamp 410. The head 431 is provided with a socket-type opening adapted to receive a suitable adjusting wrench to effect the positioning of the clamp and chaser unit. This head is eccentrically displaced with respect to the axis of the cylindrical stem 432 of the adjustment member 430. Stem 432 is located within a suitable bore 435 of the holder 400; and a locking screw 450, threaded into the holder 400, has its end 451 abutting the periphery 452 of the stem 432. However, the graduations are now placed on the top surfaces of the holder and of the clamp; the zero marks being preferably located on the former.

In this form the primary set of graduations, utilized to make thread size adjustments, are shown on the left and have a corresponding set of zero marks on the holder. To the right are three companion groups of secondary graduations for grinding adjustment, also having zero marks. As will be readily understood the manner of using these graduations is the same as that described above in connection with Figures 12 and 12A. However, since separate zero lines are now provided the secondary group may have four lines, as shown, so that the primary set of graduations may be dispensed with if desired. In Figure 16, the assembly is set for cutting a ¼ inch thread with a chaser having its cutting edge ground to the beginning of an adjustment serration. This method of graduating is preferable where a large number of radial lines on the top of the head of the adjustment member would result in confusing the machine operator, and may, of course, be used on clamps 40, 100, 210 and 310, and holders 30, 101, 200, and 300, if desired.

While the several improved types of adjustment means and novel setting indicia described herein are especially adapted for use in connection with our novel thread chasers they may also be used with other types of chasers and chaser assemblies, for example, such as are shown in the patents to Newman, No. 1,692,514 and Reimschissel No. 2,082,757 and also in our co-pending application above mentioned.

From the foregoing it will be apparent that we have provided several improved chaser holder assemblies, embodying novel adjustment devices peculiarly adapted for use with the novel chasers herein disclosed. These novel adjustment devices make possible easy and accurate setting of chasers of the inclined thread serration type, both initially and after grinding, so that the axial relationship of the several chasers of a set will be maintained.

Our novel chasers have adjustment serrations definitely located with respect to inclined thread serrations thus facilitating matched chaser grinding regardless of the type of holder assembly in which they are to be used.

Our invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A chaser assembly comprising a holder having chaser seating surfaces and a clamp surface thereon; a tangential chaser seated on said seating surfaces and having threading serrations on a face thereof inclined with respect to its longitudinal axis; a clamp for clamping said chaser to said holder; interfitting means on said clamp and said chaser; and adjustment means on said holder and engaging said clamp for longitudinally adjusting said chaser and said clamp, bodily as a unit, along said holder.

2. A chaser assembly comprising, a holder having chaser seating surfaces and a clamp surface thereon; a chaser seated on said seating surfaces and having a face thereof provided with threading serrations obliquely inclined with respect to its longitudinal axis; a clamp for clamping said chaser to said holder; interfitting serrations on said clamp and said chaser for locking said chaser to said clamp in any one of a plurality of predetermined positions; adjustment means on said holder and cooperating with said clamp for moving said clamp and chaser bodily as a unit to adjust said chaser longitudinally of said holder said adjustment means having an operative range at least as great as the pitch of said interfitting serrations, whereby said chaser may be infinitely adjusted with respect to said holder.

3. A chaser assembly, comprising, a holder; a chaser mounted on said holder and having inclined threading serrations thereon; a clamp for clamping said chaser to said holder; means for interlocking said chaser to said clamp for unitary movement therewith; adjustment means on said holder and engaging said clamp to move the same for adjusting said chaser; means for indicating the adjusted position of said chaser, said means including indicia for determining the correct tangential setting of said chaser for various thread sizes and for re-establishing said correct settings after the chaser has been ground.

4. A chaser assembly as set forth in claim 3 wherein said indicia are associated with said clamp and said holder.

5. A chaser assembly as set forth in claim 3 wherein said indicia are associated with said clamp and said adjustment means.

6. A chaser assembly comprising a holder; a chaser mounted on said holder; a clamp for clamping said chaser to said holder; means for locking said chaser to said clamp for unitary movement therewith; means on said holder for adjusting said clamp and chaser, said last-named means including an eccentric element engaging said clamp.

7. A chaser assembly comprising a holder; a chaser mounted on said holder; a clamp for clamping said chaser to said holder; means for locking said chaser to said clamp for unitary movement therewith; means journaled in said holder and having an eccentric head engaging said clamp for adjusting said clamp and chaser.

8. A chaser assembly comprising a holder; a chaser mounted on said holder, a clamp for clamping said chaser to said holder; means for locking said chaser to said clamp for unitary movement therewith; means for moving said clamp, said means comprising a rotatable member journaled in said holder and having an eccentric portion engaging said holder.

9. A chaser assembly comprising a holder; a chaser mounted on said holder; a clamp for clamping said chaser to said holder and having a slot therein; means for locking said chaser to said clamp for unitary movement therewith; means for moving said clamp, said means comprising a rotatable member journaled in said holder and having an eccentric portion riding in said slot.

10. A chaser assembly comprising a holder, a chaser mounted on said holder; a chaser clamp; means for locking said chaser to said clamp for unitary movement therewith; means for moving said clamp, to adjust said chaser, comprising a rotatable eccentric device associated with said clamp and holder, and means for locking said eccentric device against rotation to lock said chaser in adjusted position.

11. In a chaser assembly, a chaser having threading serrations thereon inclined with respect to its longitudinal axis; an adjustable clamp; chaser seating surfaces; matching serrations on said chaser and clamp for locking said chaser to said clamp for unitary movement therewith, said chaser serrations having crests providing an offset seating surface for engaging said chaser seating surfaces.

12. In a chaser assembly, a holder, a chaser, a chaser clamp, a recess in said clamp, a clamping screw having a head located within said recess, the sides of said recess and the periphery of said head being oppositely bevelled whereby extraneous matter is ejected from said recess when said screw is turned.

13. A chaser having a thread-cutting face which has located thereon a series of thread cutting serrations inclined with respect to the longitudinal axis of the chaser and a throat surface, a bevelled base, a back seating surface, a clamping surface, and an offset seating surface, back of said throat surface, said offset seating surface being provided with adjustment serrations.

14. A chaser having a face, a bevelled base, and an offset seating surface, said face being provided with thread-cutting serrations inclined with respect to said bevelled base, adjustment serrations on said offset seating surface, and a throat surface on said face parallel to said thread-cutting serrations.

15. A chaser having a face, a bevelled base, said face being provided with thread-cutting serrations inclined with respect to said bevelled base, adjustment serrations on a surface other than said face of said chaser and a throat surface on said face parallel to said thread-cutting serrations.

16. A chaser assembly comprising a holder; a chaser mounted on said holder; a clamp for clamping said chaser to said holder; means for locking said chaser to said clamp for unitary movement therewith; means on said holder for adjusting said clamp and chaser bodily along said holder, said last-named means including an eccentric element engaging said clamp; and cooperating indicia means provided on said clamp and said eccentric element for determining the correct tangential setting of said chaser for various thread sizes and for re-establishing said correct setting after the chaser has been ground.

17. A chaser assembly comprising a holder; a chaser mounted on said holder; a clamp for clamping said chaser to said holder; means for locking said chaser to said clamp for unitary movement therewith; means journalled in said holder and having an eccentric head engaging said clamp for adjusting said clamp and chaser bodily with respect to said holder; and cooperating indicia means provided on said chaser and said eccentric head for determining the correct tangential setting of said chaser for various thread sizes and for re-establishing said correct setting after the chaser has been ground.

18. A chaser assembly comprising a holder having chaser seating surfaces and a clamp surface thereon; a tangential chaser seated on said seating surfaces and having threading serrations on a face thereof inclined with respect to its longitudinal axis; a clamp for clamping said chaser to said holder; interfitting means on said clamp and said chaser; adjustment means on said holder and engaging said clamp for longitudinally adjusting said chaser and clamp bodily as a unit, along said holder; and indicia means associated with said clamp for indicating the amount of chaser adjustment in fractional parts of the pitch of said interfitting means.

CHARLES A. REIMSCHISSEL.
EDWIN M. EIGENBRODE.